United States Patent [19]

Cecil et al.

[11] Patent Number: 5,351,863

[45] Date of Patent: Oct. 4, 1994

[54] MANUALLY-OPERATED DISPENSING PUMP

[75] Inventors: Howard E. Cecil, Miramar, Fla.; Thomas Dupont, Hoschton, Ga.

[73] Assignee: Dupont Industries, Inc., Braselton, Ga.

[21] Appl. No.: 27,448

[22] Filed: Mar. 8, 1993

[51] Int. Cl.⁵ .............................................. G01F 11/00
[52] U.S. Cl. .................................. 222/259; 222/321; 222/340; 222/385
[58] Field of Search ............... 222/252, 259, 321, 340, 222/383, 385; 239/333

[56] References Cited

U.S. PATENT DOCUMENTS

| | | | |
|---|---|---|---|
| 4,079,865 | 3/1978 | Kutik | 222/259 |
| 4,089,442 | 5/1978 | Hafele et al. | 222/385 X |
| 4,146,155 | 3/1979 | Kutik | 222/109 |
| 4,315,582 | 2/1982 | Micallef | 222/148 |
| 4,452,379 | 6/1984 | Bundschuh | 222/207 |
| 4,538,745 | 9/1985 | Dunning et al. | 222/321 X |
| 4,728,009 | 3/1988 | Schmidt | 222/321 |
| 4,826,052 | 5/1989 | Micallef | 222/321 |
| 4,991,746 | 2/1991 | Schultz | 222/321 |
| 5,211,315 | 5/1993 | Geier | 222/383 |

FOREIGN PATENT DOCUMENTS 1391242  3/1964  France ........................... 222/321

*Primary Examiner*—Andres Kashnikow
*Assistant Examiner*—Joseph A. Kaufman
*Attorney, Agent, or Firm*—Oltman and Flynn

[57] ABSTRACT

A manually-operated dispensing pump for attachment to a container. The pump has a cylinder and a plunger with first and second skirts slidable in the cylinder. The plunger moves in one direction in an intake stroke and is manually-operated to move in the opposite direction in a pressurizing stroke. The plunger has a passage extending to a spray head on its end away from the cylinder for passing flowable product to the spray head. The pump has structure for connecting the interior of the container above the level of the product in it to the atmosphere during each pressurizing stroke of the plunger.

10 Claims, 4 Drawing Sheets

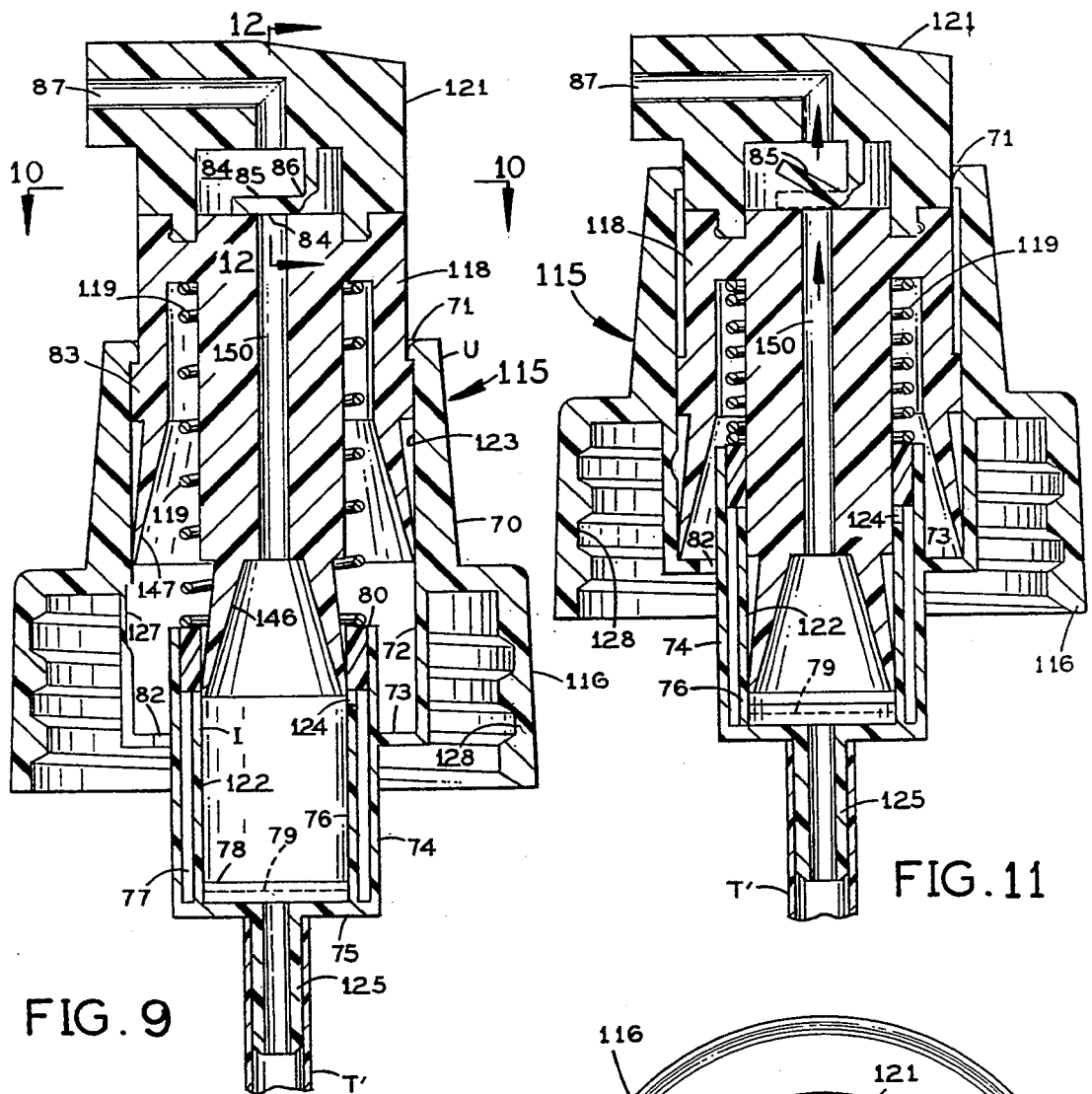
FIG. 9
FIG. 11
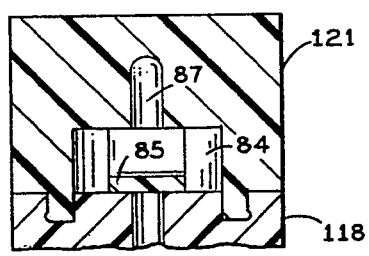
FIG. 12
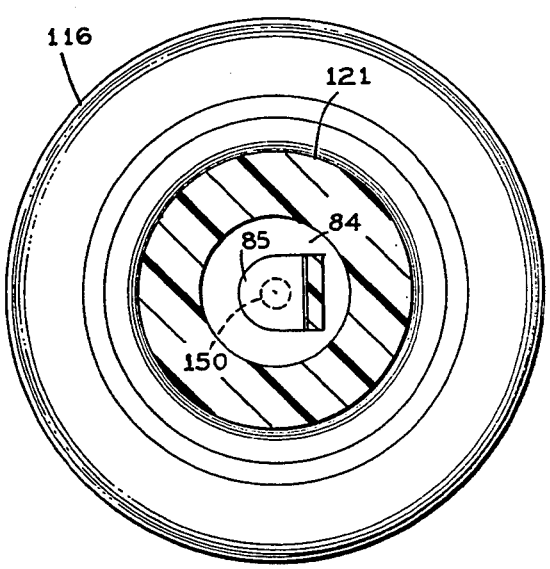
FIG. 10

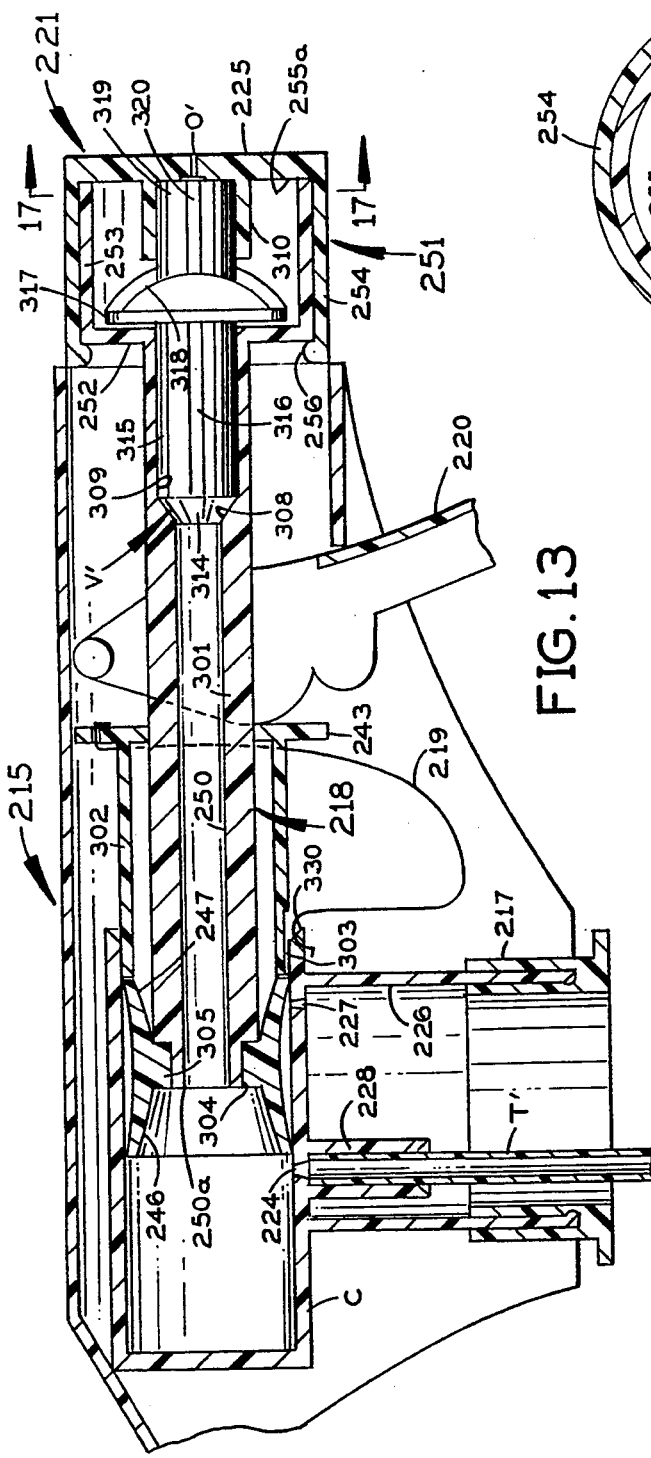
FIG. 13
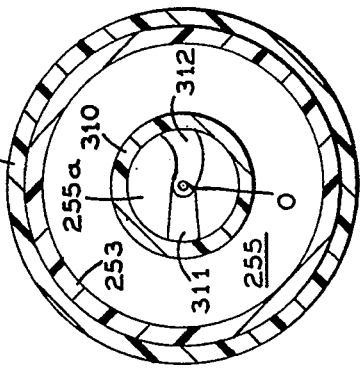
FIG. 17
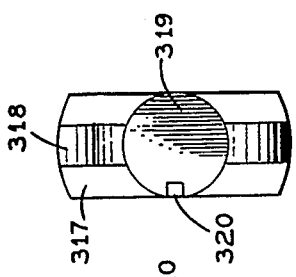
FIG. 16
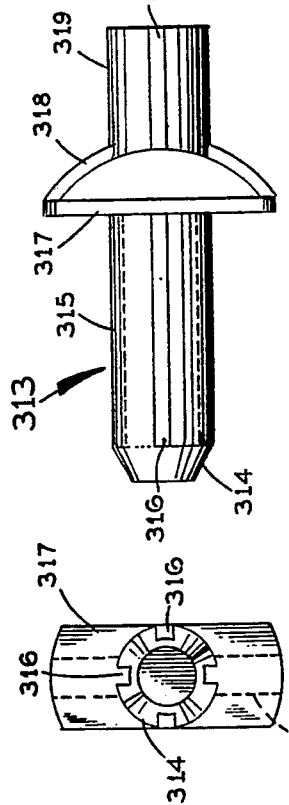
FIG. 14
FIG. 15

MANUALLY-OPERATED DISPENSING PUMP

SUMMARY OF THE INVENTION

This invention relates to a pump for attachment to a container and operative manually to withdraw flowable product, usually a liquid, from the container and dispense it.

Various manually-operated pumps for this same purpose have been proposed heretofore. Many such prior pumps have at least one ball check valve which opens to admit product from the container into the pump in its intake stroke and closes automatically to prevent reverse flow of product back into the container from the pump in its pressurizing stroke. These check valves have a tendency to malfunction and interfere with the proper operation of the pump.

The present invention avoids this problem by providing a novel manually-operated pump which does not require a ball check vale at its inlet from the product container.

A principal object of this invention is to provide a novel manually-operated pump for attachment to a container and operable to withdraw product from the container into the pump in an intake stroke of the pump and to dispense product from the pump in a pressurizing stroke of the pump.

Another object of this invention is to provide such a pump having a novel cylinder-and-piston arrangement controlling the withdrawal of product from the container into the pump and the dispensing of product from the pump in a novel and effective manner.

Preferably, the present pump has: a cap for attachment to the neck of a bottle or other container of product to be dispensed; a body defining cylinder means having a product inlet opening communicating with the upper end of the container, and a vent opening; a reciprocable plunger having first and second annular skirts slidable along the inside of the cylinder means, and a longitudinal passage for receiving product from the inlet opening; a spray head connected to receive product from the longitudinal passage in the plunger; a spring for moving the plunger in one direction in an intake stroke to draw product in through the inlet opening; and manually operated means for moving the plunger in the opposite direction in a pressurizing stroke to force the product through the longitudinal passage in the plunger to the spray head.

Further objects and advantages of this invention will be apparent from the following detailed description of three presently preferred embodiments which are illustrated schematically in the accompanying drawings.

DESCRIPTION OF THE DRAWINGS

FIG. 9 is a vertical section through a finger-operated pump according to a second embodiment of this invention;

FIG. 10 is a horizontal cross-section taken along the line 10—10 in FIG. 9 through the spray head;

FIG. 11 is a view like FIG. 9 but showing the position of the parts when the spray head is pushed down;

FIG. 12 is a vertical cross-section taken along the line 12—12 in FIG. 9 through the spray head;

FIG. 13 is a vertical longitudinal section through a trigger-operated pump in accordance with a third embodiment of this invention;

FIG. 14 is a side elevation of the pressure regulating valve in this pump;

FIG. 15 is an end elevation taken from the left end of FIG. 14;

FIG. 16 is an end elevation taken from the right end of FIG. 14; and

FIG. 17 is a rear elevation of the end cap in the spray head in this pump.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

First Embodiment - FIGS. 1-8

Figure 2:
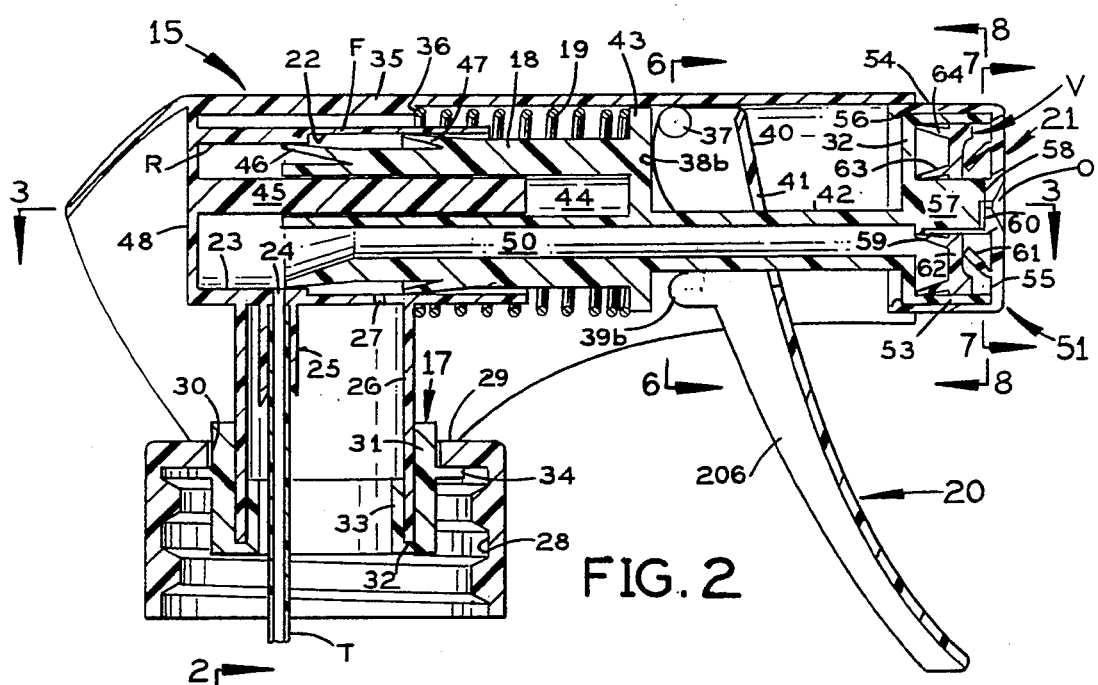
FIG. 2 is a vertical longitudinal section through this pump taken along the line 2—2 in FIG. 1.
Figure 1:
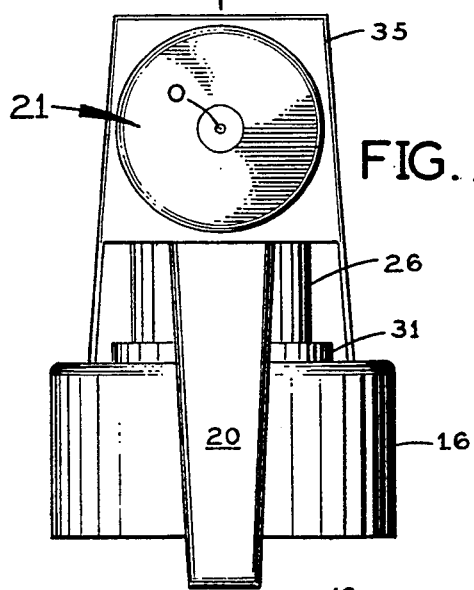
FIG. 1 is a front elevation of a trigger-operated pump according to a first embodiment of this invention.
Figure 4:
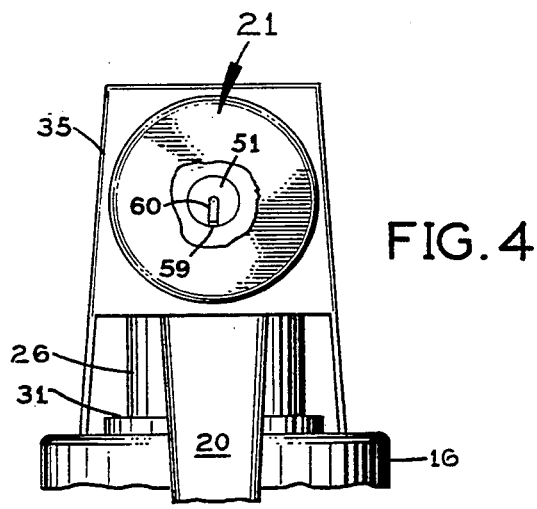
FIG. 4 is a view generally like FIG. 1 but with the spray nozzle broken away.
Figure 3:
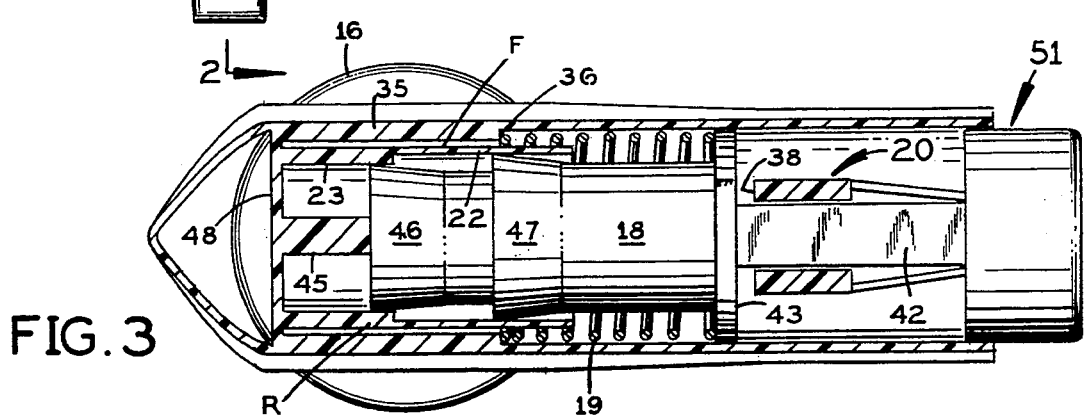
FIG. 3 is a horizontal longitudinal section taken along the line 3—3 in FIG. 2.

Referring to FIG. 2, in broad outline this embodiment of the present dispensing pump comprises a pump body 15 which provides an inner, rear cylinder R and an outer front cylinder F, a cap 16 for attaching the pump body to a container holding the liquid or other flowable product that is to be dispensed, a dip tube T extending from pump body 15 down through cap 16 and into the container for passing a flowable product up from the container into the rear cylinder R on the pump body, a coupling body 17 which couples pump body 15 to cap 16, a plunger 18 slidably reciprocable in the front end rear cylinders F and R on the pump body, a spring 19 acting between the pump body and the plunger, a trigger 20 for retracting plunger 18 against the bias exerted by spring 19, and a spray head 21 on the front of plunger 18.

In the pump body 15, the outer front cylinder F is joined integrally to the front end of the inner, rear cylinder R and extends coaxially in front of it. The front cylinder F has a cylindrical inside surface 22 of slightly larger diameter than the cylindrical inside surface 23 of rear cylinder R. The rear cylinder R has a small circular bottom opening 24 for passing the flowable product from the dip tube T into the rear cylinder. A small diameter cylindrical inner neck 25 extends down from rear cylinder R around the opening 24 and it receives the upper end of dip tube T with a tight sliding fit. A cylindrical outer neck 26 of larger diameter extends down from the pump body off-center from the inner neck 25. The front cylinder F has a small circular vent opening 27 on the bottom inside the outer neck 26 and outside the inner neck 25 on the pump body.

The cap 16 is internally screw-threaded at 28 for screw-on attachment on the neck of a container (not shown) for the liquid or other flowable product that is to be sprayed. The top wall 29 of the cap has a circular opening 30.

The coupling body 17 has a cylindrical outer side wall 31 which extends down loosely through the top opening 30 in cap 25. At its lower end, side wall 31 is joined integrally to a flat, inwardly extending, annular, bottom wall 32 that extends just beneath the bottom edge of the outer neck 26 on the pump body. A cylindrical inner wall 33 of coupling body 17 extends up from its bottom wall 32. The outer neck 26 of the pump body has a tight fit between the inner and outer side walls 33 and 31 of coupling body 17. A flat, annular, outer flange 34 extends out from the outer side wall 31 below the top opening 30 in cap 16. This flange engages the bottom of the cap's top wall 29 around this opening.

The pump body 15 presents an outer wall 35 of inverted channel shape which extends across the top (FIG. 2) and down the opposite sides (FIG. 3) and is thicker at the rear than at the front. At the juncture between its thick rear portion and its thinner front portion, the outer wall 35 of the pump body presents an internal, forwardly-facing, transverse shoulder 36 which is engaged by the back end of spring 19. The lower part of spring 19 at this end engages the front of the outer neck 26 of the pump body. The rear half of spring 19 extends closely outside the front cylinder F in front of the outer neck 26.

The trigger 20 is generally channel-shaped or bifurcated in cross-section, presenting opposite sides 20a and 20b (FIG. 6) and a bridging segment 40 extending between then at the front. At the top of the trigger, its sides 20a and 20b have respective outwardly projecting, cylindrical protrusions 37a and 37b which are rotatably received in complementary recesses on the inside of the outer wall 35 of the pump body. These protrusions mount the trigger pivotally on the pump body. Each of the opposite sides 20a and 20b of the trigger presents upper and lower cam surfaces at the back of the trigger. The upper cam surface 38b and the lower cam surface 39b on side 20b has upper and lower cam surfaces identical to these. The front segment 40 of trigger 20 has a vertically elongated opening 41.

The plunger 18 has a hollow stem 42 which passes loosely through the opening 41 in the front segment 40 of trigger 20. Behind the trigger, plunger 18 presents a transverse wall 43 which slidably engages the inside of the outer wall 35 of pump body 15 in front of its front cylinder F. The front end of spring 19 engages the rear face of this plunger wall 43 and normally holds its front face against the upper cam surface 38b of trigger 20, as shown in FIG. 2. When the user retracts the trigger, as shown in FIG. 5, first the upper cam surface 38b and later the lower cam surface 39a and 39b on the back of the trigger push the plunger 18 back, overcoming the forward bias exerted by spring 19 and increasing the compression of this spring.

Figures 5, 6, 7, 8:
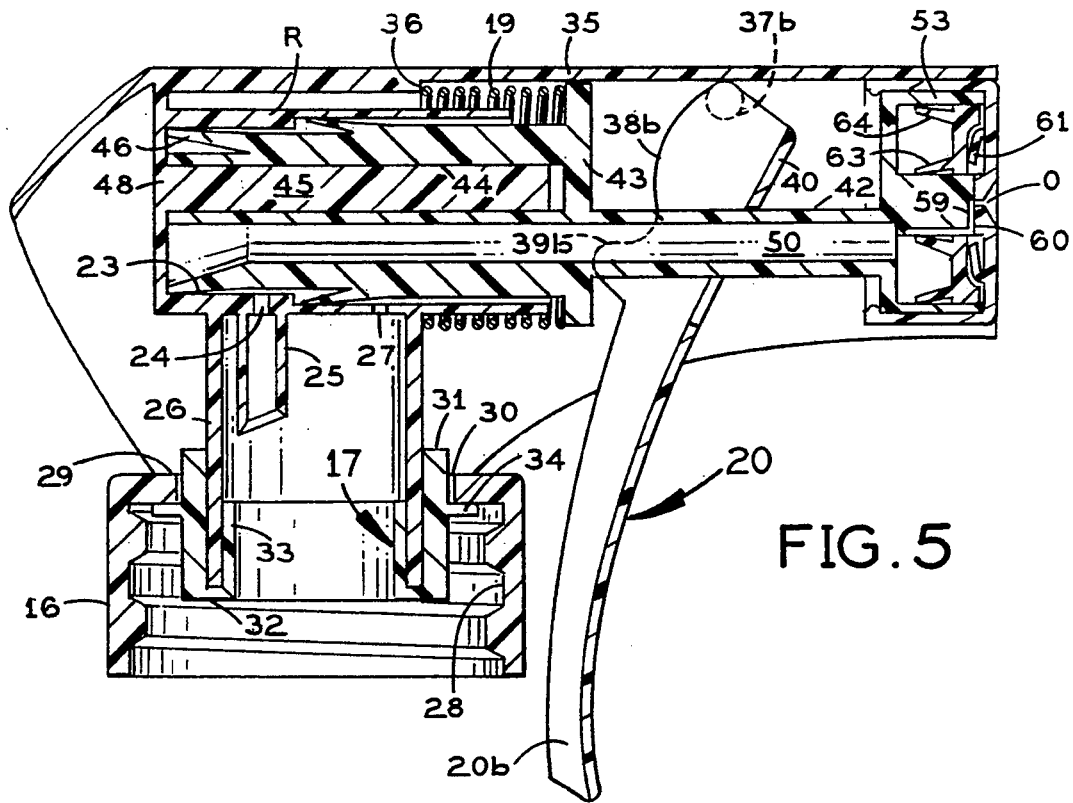
FIG. 5 is a view like FIG. 2 but showing the position of the parts when the trigger is retracted.
FIG. 6 is a vertical cross-section taken along the line 6—6 in FIG. 2 immediately behind the trigger.
FIG. 7 is a vertical cross-section taken along the line 7—7 in FIG. 2 through the spray nozzle.
FIG. 8 is a similar view taken along the line 8—8 in FIG. 2.

Behind its transverse wall 43, the plunger 18 has a longitudinal recess 44 which is open at its back end and slidably receives a longitudinal stem 45 on the inside of pump body 15 to guide the plunger for reciprocation along the inside of the pump body between its extended, forward position (FIG. 2) and its retracted, rearward position (FIG. 5). Stem 45 is joined to a transverse back wall 48 of the pump body 15 inside its outer wall 35.

The rear cylinder R of the pump body is joined at its rear end to the back wall 48 of the pump body.

At its back end, plunger 18 has an annular, outwardly and rearwardly inclined, flexible and resilient, rear, inner, first skirt 46 of tapered cross-section. This first skirt sealingly engages the inside surface 23 of the rear cylinder R on pump body 15. In front of the rear tip of this first skirt 46, the plunger has a clearance from the inside surface 23 of rear cylinder R.

The plunger also has an annular, outwardly and rearwardly inclined, flexible and resilient, front, outer, second skirt 47 of tapered cross-section which sealingly engages the inside surface 22 of the front cylinder F on pump body 15. In front of the rear tip of this second skirt 47, the plunger has a substantial clearance from the inside surface 22 of front cylinder F.

As shown in FIG. 2, when plunger 18 is in its normal, extended (forward) position, the inner, rear, first plunger skirt 46 is in front of the product inlet opening 24 in rear cylinder R, and the outer, front, second plunger skirt 47 is in front of the vent opening 27 in front cylinder F. As shown in FIG. 5, when the plunger 18 is fully retracted, the first plunger skirt 46 is behind the product inlet opening 24 and it abuts against the back wall 48 of pump body 15, and the second plunger skirt 47 is behind the vent opening 27. In this fully retracted position of the plunger, its transverse wall 43 is spaced from the front edge of front cylinder F, so that the bottom vent opening 27 in front cylinder F communicates with the ambient atmosphere through the space between the plunger and the inside surface 22 of front cylinder F and the space between the front edge of cylinder F and the transverse wall 43 of the plunger.

The plunger 18 has a longitudinal passage 50 which is open at its back end and extends through the stem 42 to the spray head 21 on the front end of the plunger. As shown in FIG. 2, the plunger passage 50 is open at its back end to the product inlet opening 24 in pump body 15 when the plunger is in its extended (forward) position. The spray head 21 on the front end of plunger 18 has a flat back wall 52 extending perpendicularly out from the plunger stem 42 and a cylindrical side wall 53 extending forward from back wall 52. The spray head 21 also has an end cap 51 with a cylindrical side wall 54 extending snugly around wall 53 and a transverse front wall 55 with a centrally located spray opening O. Wall 54 of the cap is slidably received inside the front end of the pump body 15 and it has a rounded annular bead 56 on the inside just behind the back wall 52 of the spray head.

The spray opening O in the front wall 55 has a small circular inlet at the back and a frusto-conical segment at the front to produce a diverging spray of the liquid or other flowable product.

The spray head 21 on plunger 18 has a central stub 57 of circular cross-section on the inside projecting forward from its back wall 52 above the product passage 50 in the plunger. Stub 57 has a flat front face 58 which engages the rear face of the front wall 55 on the end cap 51 around the rear end of its discharge opening O. Stub 57 has a narrow longitudinal groove 59 on the bottom (FIGS. 2, 7 and 8) and a narrow groove 60 in its front face 58 which extends up from the bottom groove 59 to the rear end of the discharge opening O.

The end cap 51 of spray head 21 has four circumferentially spaced, flexible and resilient fingers 61 (FIGS. 2 and 7) projecting rearward from its front wall 55.

An annular valve V (FIG. 2) is slidably received in the spray head 21 on plunger 18. This valve has a transverse front wall 62, which is engaged by the free ends of the flexible and resilient fingers 61 on the end cap 51 of the spray head. Valve V has a flexible and resilient, annular inner skirt 63 of tapered cross-section which is inclined laterally inward behind its front wall 62 and sealingly engages the stub 57 on plunger 18. Valve V also has a flexible and resilient, annular, outer skirt 64 of tapered cross-section which is inclined laterally outward behind its front wall 62 and sealingly engages the inside of the cylindrical side wall 53 of the spray head.

Normally, as shown in FIG. 2, the flexible and resilient fingers 61 on the end cap 51 of the spray head bias the valve V rearward to a position in which the back edges of its inner and outer skirts 63 and 64 engage the back wall 52 of the spray head and its inner skirt 63 blocks the bottom groove 59 in stub 57 from fluid communication with the longitudinal passage 50 in the plunger stem 42. When the liquid or other flowable product in passage 52 is pressurized, it forces valve V forward (FIG. 5), uncovering the back end of the bottom groove 59 in the plunger stem 57 so that the pressurized product can flow forward through this bottom groove, up through the front groove 60 in the plunger stem and out through the discharge opening O in the end cap 54, 55 of the spray head.

Operation

During an intake stroke of the pump, the plunger 18 moves forward from the position shown in FIG. 5 to the position shown in FIG. 2. To effect this, the user releases the trigger 20, permitting the spring 19 to push plunger 18 to the right in these Figures (i.e., forward). During such movement, the first skirt 46 on the plunger moves along the inside surface 23 of the rear cylinder R past the product inlet port 24, creating a partial vacuum to draw the flowable product up from the container through the dip tube T and into the longitudinal passage 50 in plunger 18. Also, in this intake stroke, the second skirt 47 on the plunger moves forward past the vent opening 27, blocking it from the ambient atmosphere just slightly before the first skirt 46 begins to unblock the product inlet port 24. The pressure reduction in passage 50 produced by this movement of the plunger permits valve V in the spray head to move to its closed position (FIG. 2) under the influence of the flexible and resilient fingers 61 on the end cap 51 of the spray head 21. Therefore, the inner skirt 63 on valve V blocks the bottom groove 59 in stem 57 on the plunger and prevents the flow of product to the discharge opening O in the spray head.

During a pressurizing stroke of the pump, plunger 18 moves back from the position shown in FIG. 2 to the position shown in FIG. 5. The user effects this by pulling the trigger 20 rearward. During this movement of the plunger, its first skirt 46 moves along the inside surface 23 of rear cylinder R back past the product inlet port 24 and the flowable product is pressurized in passage 50 in the plunger. The pressure of this product in passage 50 moves valve V forward in the spray head, unblocking the bottom groove 59 in stem 57 so that product can flow from plunger passage 50 through groove 59, up through the front groove 60 and out the discharge opening O. Also during this pressurizing stroke, the second skirt 47 on plunger 18 moves along the inside surface 22 of the front cylinder F back past the vent opening 27, which now vents to the atmosphere the interior of the product container above the product level therein.

In the next intake stroke of plunger 18, valve V again goes to the position shown in FIG. 2, blocking the bottom groove 59 in plunger stem 57. Thus, valve V acts as a check valve preventing the flowable product from dribbling out of the discharge opening O of the spray head during an intake stroke. Also, the first skirt 47 on the plunger blocks the vent opening 27 from the atmosphere and prevents ambient air from being drawn into the top of the product container.

Second Embodiment - FIGS. 9-12

FIGS. 9-12 show a finger-operated second embodiment of the present invention, in which the flowable product is dispensed by pushing down on a spray head 121 at the top. Elements of the second embodiment which correspond functionally to elements of the embodiment shown in FIGS. 1-8 are given the same reference numerals plug 100 as those in FIGS. 1-8 to simplify the description.

The pump body 115 and the screw-threaded cap 116 for attaching it to the top of a product container are molded as an integral one-piece body. Above its cap segment 116 the pump body 115 has an annular, upwardly extending segment 70 which defines the upper part of the outer cylinder U of the pump, having a cylindrical inside surface 123. At the top, the upper cylinder terminates in an inturned annular lip 71. The pump body has an internal cylindrical wall 72 which extends down from segment 70 and provides a continuation of the cylindrical inside surface 123. Wall 72 extends coaxially inside the cap segment 116.

An annular transverse wall 73 extends in from the lower end of wall 72 to a cylindrical wall 74 of smaller diameter than wall 72 and extending concentric with it. Transverse wall 73 is formed with a vent hole 82. Cylindrical wall 74 extends above and below the transverse wall 73.

An annular transverse bottom wall 75 extends in from the lower end of wall 74 to a downwardly projecting cylindrical neck 125. The upper end of a dip tube T' is slidably received tightly on neck 125. This dip tube extends down into the container which holds the flowable product that is to be dispensed by this pump.

A cylindrical inside wall 76 of the pump body extends concentrically inside the wall 74 for most of the height of the latter. A cylindrical space 77 extends above the bottom wall 75 between walls 74 and 76. A flat wall 78 extends across the inside of wall 76 a short distance above wall 75. Between walls 78 and 75 the pump body defines a generally circular chamber 79 which is open at its center to the upper end of the passage through neck 125 and is open at its periphery to the upwardly extending cylindrical space 77. The inside wall 76 has two or more circumferentially spaced legs at its lower end which join it to the bottom wall 75 and between these legs it provides arcuate openings connecting the chamber 79 to the upwardly extending cylindrical space 77.

An annular plug 80 sealingly engages the inside of cylindrical wall 74 and the top edge of the inside wall 76 at the upper end of the space 77 between them. The inside wall has a recess 124 in its top edge which provides a product inlet opening for passing the flowable product from the upper end of the space 77 into the interior of the cylinder formed by the inside wall 76 above wall 78. This is the inner cylinder I of the pump and it has a cylindrical inside surface 122.

A plunger 118 (corresponding to the plunger 18 in FIGS. 1–8) is slidably reciprocable up and down in the pump body 115. Plunger 118 has an annular, outwardly and downwardly inclined, flexible and resilient, outer skirt 147 of tapered cross-section which is slidably engageable sealingly with the inside surface 123 of the outer, upper cylinder U. Plunger 118 at its lower end has an annular, outwardly and downwardly inclined, flexible and resilient, inner skirt 146 of tapered cross-section which is slidably engageable sealingly with the inside surface 122 of the inner, lower cylinder I.

The cylindrical inside surface 123 of the upper cylinder U is interrupted on one side by a longitudinally extending depression or recess 127 which provides a vent passage which the outer skirt 147 on plunger 118 slides past as the plunger moves down and up. Above its outer skirt 147 the plunger presents a cylindrical collar 83 which is slidable along the inside surface 123 of upper cylinder U with enough clearance between them to permit ready air leakage between them. A coil spring 119 is engaged under compression between plunger 118 and the top of plug 80 to bias the plunger up to the position shown in FIG. 9, in which the plunger collar 83 engages the inturned lip 71 on the pump body 115.

The spray head 121 is attached to the upper end of plunger 118 in fluid-tight fashion. Spray head 121 has an inlet chamber 84 which registers with longitudinal passage 150 in the plunger at its upper end. A flapper valve 85 is hingedly attached to the main body of the spray head by a flexible and resilient segment 86 of reduced thickness which normally biases valve 85 down to the position shown in FIG. 9, in which it blocks the longitudinal passage 150 in plunger 118 from the inlet chamber 84 of the spray head. As shown in FIG. 11, when the pressure in passage 150 is high enough it pivots valve 85 upward to permit the flowable product to pass up from passage 150 into the inlet chamber 84 of the spray head. The spray head has a discharge passageway 87 which opens into the upper end of inlet chamber 84 above valve 85. Valve 85 acts as a one-way check valve in spray head 121.

OPERATION

In the operation of the dispensing pump shown in FIGS. 9–12, during an intake stroke the plunger 118 moves up from the position shown in FIG. 11 to the position shown in FIG. 9. To effect this, the user releases the spray head 121, permitting the spring 119 to push the plunger up. During such upward movement of the plunger, its inner skirt 146 moves up along the inner cylinder I and creates a partial vacuum therein. When skirt 146 moves up past the product inlet opening 124 at the upper end of the inner cylinder I, the partial vacuum in the inner cylinder draws flowable product up from the container through dip tube T′ and neck 125 on the bottom of the pump body and from there through bottom chamber 79 and annular space 77 into the inner cylinder. The pressure reduction in plunger passage 150 produced by this upward movement of the plunger permits valve 85 to move to its normal closed position (FIG. 9), preventing the flow of product to the discharge passage 87 in spray head 121.

During a pressurizing stroke of the pump, the user presses down on spray head 121, moving plunger 118 down from the position shown in FIG. 9 to the position shown in FIG. 11. During this downward movement of the plunger, first, its inner skirt 146 moves down past the product inlet opening 124 to inner cylinder I and the flowable product in this chamber is pressurized by the continued downward movement of the plunger. The pressure of the product in plunger passageway 150 moves valve 85 up to an unseated position so that product can flow up into the inlet chamber 84 in the spray head 121 and from there out through the discharge passage 87. Continued downward movement of the plunger moves its outer skirt 147 past the vent passage 127 in the outer cylinder, so that ambient atmosphere air pressure is applied through this groove and vent hole 82 to the interior of the container above the product level therein. Stated another way, it vents to the atmosphere the interior of the container above the product level therein.

In the next intake stroke of the plunger, valve 85 again closes, blocking the product passageway 150 in the plunger from the inlet chamber 84 in spray head 121. Thus, valve 85 acts as a check valve preventing the flowable product from dribbling out of the discharge passage 87 in the spray head 121 during an intake stroke. Also, the outer skirt 147 on the plunger moves up past the vent passage 127 in the upper cylinder U, blocking the vent hole 82 from the atmosphere and preventing ambient air from being drawn into the product container above the level of the flowable product in it.

Third Embodiment - FIGS. 13–17

FIG. 13 is a trigger-operated pump in accordance with a third embodiment of the present invention which is generally similar to the first embodiment, shown in FIGS. 1–8. Elements in the third embodiment which correspond to those in the first embodiment are given the same reference numerals plus 200 as those in the first embodiment, making a detailed description of many of these elements unnecessary.

As shown in FIG. 13, in broad outline this pump has a pump body 215 which provides a cylinder C, a flanged coupling body 217 holding a cylindrical outer neck 226 which extends down from cylinder C, a dip tube T′ extending down from the cylinder through coupling body 217 and down through a screw-threaded annular cap (not shown) into the product container, a plunger 218 slidably reciprocable in cylinder C, a spray head 251 on the front end of plunger 218, a pressure regulating valve V′ controlling the flow of product from the interior of plunger 218 to spray head 251, and a pivoted manually operable trigger 220 for operating the pump.

The upper end of dip tube T′ is held in a cylindrical inner neck 228 extending down from cylinder C inside the outer neck 226. Cylinder C has a product inlet opening 224 at the upper end of tip tube 228 for passing into the cylinder the flowable product that is drawn out of the container and up along the inside of the dip tube.

To the right of the product inlet opening 224 in FIG. 13 (i.e., toward the spray head 251) the cylinder C has a vent opening 227 located inside the outer neck 226 on the pump body away from its inner neck 228 and dip tube T′.

Plunger 218 is of two-piece construction, including an elongated, hollow, generally cylindrical, inner member 301 and a shorter, flanged, generally cylindrical, outer member 302 rigidly affixed to inner member 301 so that they reciprocate in unison.

The outer plunger member 302 has a cylindrical outer periphery with a sliding fit inside cylinder C and a shallow longitudinal recess 303 on the bottom at its back end (the left end in FIG. 13). When recess 303 on the outer plunger member registers with the cylinder opening 227, the inside of the product container above the liquid therein is connected to the atmosphere adjacent the pump.

A bifurcated wire spring 219 acts between cylinder C and the flange 243 on the front end of the outer plunger member 302 to bias plunger 218 forward (to the right in FIG. 13). Cylinder C has a beveled front edge 330 which is engaged by a bight segment of the spring that extends beneath the outer plunger member 302. From this bight segment the spring curves down and then up on opposite sides of outer plunger member 302 to openings in flange 243 which hold it snugly.

The inner plunger member 301 has an axially extending cylindrical passageway 250 having an inlet opening 250a at its back end (the left end in FIG. 13). At this end the inner plunger member has a short segment 304 of smaller outside diameter on which a flexible and resilient ring 305 is securely mounted. Ring 305 has a rearwardly and outwardly projecting, tapered, annular, first skirt 246 on its back end which extends rearwardly beyond the inlet opening 250a at this end of the inner plunger member 301. This first skirt 246 on ring 305 is flexible and resilient and it slidably and sealingly engages the inside of cylinder C behind the vent opening 227 in all positions of plunger 218 along cylinder C. Ring 305 also has a forwardly and outwardly projecting, tapered, annular, second skirt 247 extending forward beyond the reduced end segment 304 of inner plunger member 301. Skirt 247 is flexible and resilient and it slidably and sealingly engages the inside of cylinder C on one side or the other of its vent opening 227, depending upon the reciprocable position of plunger 218 along cylinder C. On the outside, ring 305 has a slightly concave or recessed shape between the free ends of its skirts 246 and 247.

Normally, plunger 218 and ring 305 are positioned by spring 219 as shown in FIG. 13, with the first skirt 246 in front of the product inlet opening 224 and with the second skirt 247 between the vent opening 227 and the adjacent open end of cylinder C. In this position, the interior of cylinder C communicates with the upper end of dip tube T' and the vent opening 227 is blocked from the atmosphere.

When plunger 218 is moved rearward from this position (to the left in FIG. 13), the first skirt 246 on ring 305 moves rearward across the product inlet opening 224 so that now ring 305 blocks the flow of product from the container up into cylinder C, and the second skirt 247 moves rearward across the vent opening 227, permitting the interior of the container above the product level therein to be vented to the atmosphere via recess 303 in the bottom of outer plunger member 302 leading to the open front end of the cylinder. In this stroke of the plunger, the first skirt 246 completely blocks the product inlet port 224 before the second skirt 247 begins to uncover the vent opening 227.

The central passage 250 in inner plunger member 301 leads to a frustoconical valve seat 308 which is part of a pressure regulating valve V'. Normally, a reciprocable valve member 313 in the pressure regulating valve sealingly engages valve seat 308. Forward from this valve seat the inner plunger member 301 has a cylindrical counterbore 309 of larger diameter than passage 250. At the front end of counterbore 309 (the end away from valve seat 308) the spray head 251 presents a flat back wall 252 joined to inner plunger member 301 and extending radially out from it, and a cylindrical side wall 253 extending forward from back wall 252. The spray head also has an end cap 221 which is rotatably adjustable on side wall 253. End cap 221 has a cylindrical side wall 254 extending snugly but rotatably around wall 253 and a transverse front wall 255. Side wall 254 has a rounded annular bead 256 on the inside just behind the back wall 252 of the spray head.

The end cap 221 on the spray head has a cylindrical interior wall 310 projecting rearward from its front wall 255. As shown in FIG. 17, inside this interior wall 310 the front wall 255 of end cap 251 is formed with a horizontal groove 311 on its inside face 255a (FIG. 13). Groove 311 extends radially in from wall 310 to a discharge opening O' extending through the front wall 255 of end cap 221. On the opposite side of opening O', an arcuate second groove 312 (FIG. 17) extends in front the cylindrical interior wall 310. One or the other of these two grooves 311 and 312 may be positioned to pass liquid product to the discharge opening O', depending on the position to which end cap 251 is turned. FIG. 17 shows the end cap 221 positioned so that groove 312 passes the product to the discharge opening O' so that it is discharged as discrete droplets. When the end cap 221 is turned 180 degrees from this position, the other groove 311 passes the product to the discharge opening O' and causes it to be sprayed as a continuous stream.

Referring to FIG. 14, the valve member 313 of pressure regulating valve V' has a frustoconical nose 314 on its back end which is sealingly engageable with valve seat 308 in FIG. 13 to completely block the flow of product into the spray head. In front of this nose (to the right in FIG. 13) valve member 313 has a generally cylindrical body 315 which is snugly but slidably received in counterbore 309 in the inner plunger member 301. Valve body 315 has four radial grooves 316 (FIG. 15) extending along its length and equally spaced apart circumferentially. These grooves pass product along the valve body when valve member 313 is unseated from valve seat 308. A flat transverse flange 317 is joined to the front end of valve body 315 and it projects above and below the valve body, as shown in FIGS. 14 and 16. As shown in FIG. 13, when the nose 314 of valve member 313 is seated on the valve seat 308, the flange 317 on valve member 313 is spaced slightly in front of the back wall 252 of the spray head.

A bowed leaf spring 318 engages the front face of flange 317 on valve member 313. Spring 318 is rigidly attached to a cylindrical stem or plunger 319 that is slidably received in the cylindrical interior wall 310 of end cap 251, as shown in FIG. 13. Stem 319 is formed with a longitudinal groove 320 on one side (FIGS. 14 and 16).

When the end cap 221 of the spray head is positioned as shown in FIG. 17, the outer end of its groove 312 registers with the front end of groove 320 in valve body 319 to pass product to the discharge opening O' in the spray head when valve member 313 is unseated from valve seat 308. When the end cap 221 is turned 180 degrees from the FIG. 17 position, the outer end of its groove 311 registers with the front end of groove 320 in valve body 319 to pass product to the discharge opening O' when valve member 313 is unseated from valve seat 308.

OPERATION

In the operation of the FIG. 13 dispensing pump, during an intake stroke the plunger 218 moves forward (i.e.), from left to right in this Figure) to the position shown in FIG. 13. This happens when the user releases the trigger 220, permitting spring 219 to move the plunger to this position. During such forward movement the rear first skirt 246 on ring 305 carried by the plunger moves along the inside surface of cylinder C forward past the product inlet port 224, creating a partial vacuum in the cylinder to draw the flowable product up from the container through the dip tube T' and into cylinder C. Also, in this intake stroke the front second skirt 247 on ring 305 moves forward past the vent opening 227, blocking it from the ambient atmosphere just slightly before the first skirt 246 begins to unblock the product inlet port. The pressure reduction in the central passage 250 in the plunger produced by this forward movement of the plunger permits the pressure regulating valve V' in spray head 251 to close under the influence of leaf spring 318. Valve member 313 seats on valve seat 308 and prevents the flow of product into the spray head.

During pressurizing stroke of the pump, plunger 218 moves back from the position shown in FIG. 13. The user effects this by pulling the trigger 220 rearward. During this movement of the plunger, the first skirt 246 on ring 305 moves along the inside surface of cylinder C back past the product inlet port 224 and the flowable product is pressurized in the cylinder and in the longitudinal passage 250 in the plunger. The pressure of this product in passage 250 moves valve member 313 forward in the spray head, unseating it from valve seat 308 and admitting pressurized product into the longitudinal grooves 316 in valve member 313 and groove 320 in stem 319, from which it flows through lateral groove 311 or 312 in the front end of the spray head to the discharge opening O'. Also, during this pressurizing stroke of plunger 218, the second skirt 247 on ring 305 moves along the inside surface of cylinder C back past the vent opening 227, which now vents to the atmosphere the interior of the product container above the product level therein.

In the next intake stroke of plunger 218, valve V' again closes acting as a check valve to prevent product from dribbling out of the discharge opening O' of the spray head. Also, the second skirt 247 on ring 305 carried by the plunger blocks the vent opening 227 from the atmosphere and prevents air from being drawn into the top of the product container.

We claim:

1. A manually-operated pump for dispensing a flowable product from a container through a dip tube extending down into the container comprising:
    a pump body having cylinder means with a product inlet opening for receiving product from said dip tube and a vent opening for connecting the interior of the container above the product therein to the atmosphere;
    means for mounting said pump body on the top of the container;
    a plunger reciprocable in said pump body along said cylinder means, said plunger carrying an annular first skirt slidable sealingly along the inside of said cylinder means past said product inlet opening to control the flow of product from the dip tube into said cylinder means, said plunger carrying an annular second skirt slidable sealingly along the inside of said cylinder means past said vent opening to control the venting of the interior of the container above the product therein to the atmosphere, said plunger having a longitudinal passage which at one end thereof opens into said cylinder means to receive product introduced into said cylinder means through said product inlet opening;
    a spray head connected to receive product from the opposite end of said longitudinal passage in the plunger, said spray head having a discharge opening;
    and a normally-closed check valve for blocking the flow of product from said longitudinal passage in the plunger to said discharge opening, said check valve opening in response to the pressure of product in said longitudinal passage in the plunger to pass product to said discharge opening;
    said plunger being movable (a) in one direction in an intake stroke to create a partial vacuum in said cylinder means by the movement of said first skirt therealong and to move said first skirt past said product inlet opening to draw product from the dip tube into said cylinder means and to move said second skirt past said vent opening to a position blocking said vent opening from the atmosphere, and (b) in the opposite direction in a pressurizing stroke to block said cylinder means from said product inlet opening and pressurize the product in said cylinder means and force said product into said longitudinal passage in the plunger and to move said second skirt past said vent opening to a position connecting said vent opening to the atmosphere;
    said cylinder means and said plunger providing an air passage extending from said second skirt toward spray head for connecting said vent opening to the atmosphere when said second skirt is past said vent opening in the direction along said cylinder means away from said spray head;
    said cylinder means comprising an inner cylinder with a closed end on one side of said product inlet opening and an outer cylinder which is open on the opposite side of said vent opening from said product inlet opening;
    said plunger in said intake stroke being movable in said one direction away from said closed end of the inner cylinder to slide said first skirt past said product inlet opening and draw product from the dip tube up into the inner cylinder and to slide said second skirt past said vent opening to a position blocking said vent opening from said open end of the outer cylinder;
    and said plunger in said pressurizing stroke being movable in said opposite direction toward said closed end of the inner cylinder to slide said second skirt past said vent opening to vent to the atmosphere the interior of the container above the product therein and to force the product in the inner cylinder along said longitudinal passage in the plunger to said spray head.

2. A pump according to claim 1 and further comprising:
    a spring biasing said plunger in said one direction;
    and a trigger pivoted on said pump body and engaging said plunger for moving the plunger in said opposite direction to produce said pressurizing stroke.

3. A pump according to claim 2 wherein:
    said plunger has a stem extending from said opposite end of said longitudinal passage into said spray head, said stem having a longitudinal groove on the bottom which opens at one end into said opposite end of said longitudinal passage in the plunger and a groove extending up from the opposite end of said longitudinal groove to said discharge opening in the spray head;

said check valve is an annular valve member slidably mounted on said stem of the plunger in said spray head, said valve member having a flexible and resilient lip slidingly engaging said stem;

and further comprising:

resilient means in said spray head biasing said annular valve member to a position blocking said longitudinal groove on the bottom of said stem from said longitudinal passage in the plunger, said resilient means being yieldable in response to the pressure of product in said longitudinal passage in the plunger to permit said annular valve member to be displaced to a position unblocking said longitudinal groove on the bottom of said stem.

4. A manually-operated pump for dispensing a flowable product from a container through a dip tube extending down into the container comprising:

a pump body having cylinder means with a product inlet opening for receiving product from said dip tube and a vent opening for connecting the interior of the container above the product therein to the atmosphere;

means for mounting said pump body on the top of the container;

a plunger reciprocable in said pump body along said cylinder means, said plunger carrying an annular first skirt slidable sealingly along the inside of said cylinder means past said product inlet opening to control the flow of product from the dip tube into said cylinder means, said plunger carrying an annular second skirt slidable sealingly along the inside of said cylinder means past said vent opening to control the venting of the interior of the container above the product therein to the atmosphere, said plunger having a longitudinal passage which at one end thereof opens into said cylinder means to receive product introduced into said cylinder means through said product inlet opening;

a spray head connected to receive product from the opposite end of said longitudinal passage in the plunger, said spray head having a discharge opening;

and a normally-closed check valve for blocking the flow of product from said longitudinal passage in the plunger to said discharge opening, said check valve opening in response to the pressure of product in said longitudinal passage in the plunger to pass product to said discharge opening;

said plunger being movable (a) in one direction in an intake stroke to create a partial vacuum in said cylinder means by the movement of said first skirt therealong and to move said first skirt past said product inlet opening to draw product from the dip tube into said cylinder means and to move said second skirt past said vent opening to a position blocking said vent opening from the atmosphere, and (b) in the opposite direction in a pressurizing stroke to block said cylinder means from said product inlet opening and pressurize the produce in said cylinder means and force said product into said longitudinal passage in the plunger and to move said second skirt past said vent opening to a position connecting said vent opening to the atmosphere;

said cylinder means and said plunger providing an air passage extending from said second skirt toward spray head for connecting said vent opening to the atmosphere when said second skirt is past said vent opening in the direction along said cylinder means away from said spray head;

said plunger having a stem extending from said opposite end of said longitudinal passage into said spray head, said stem having a longitudinal groove on the bottom which opens at one end into said opposite end of said longitudinal passage in the plunger, and a groove extending up from the opposite end of said longitudinal groove to said discharge opening in the spray head;

said check valve being an annular valve member slidably mounted on said stem of the plunger in said spray head, said valve member having a flexible and resilient lip slidingly engaging said stem;

and further comprising:

resilient means in said spray head biasing said annular valve member to a position blocking said longitudinal groove on the bottom of said stem from said longitudinal passage in the plunger, said resilient means being yieldable in response to the pressure of product in said longitudinal passage in the plunger to permit said annular valve member to be displaced to a position unblocking said longitudinal groove on the bottom of said stem.

5. A manually-operated pump for dispensing a flowable product from a container through a dip tube extending down into the container comprising:

a pump body having cylinder means with a product inlet opening for receiving product from said dip tube and a vent opening for connecting the interior of the container above the product therein to the atmosphere;

means for mounting said pump body on the top of the container;

a plunger reciprocable in said pump body along said cylinder means, said plunger carrying an annular first skirt slidable sealingly along the inside of said cylinder means past said product inlet opening to control the flow of product from the dip tube into said cylinder means, said plunger carrying an annular second skirt slidable sealingly along the inside of said cylinder means past said vent opening to control the venting of the interior of the container above the product therein to the atmosphere, said plunger having a longitudinal passage which at one end thereof opens into said cylinder means to receive product introduced into said cylinder means through said product inlet opening;

a spray head connected to receive product from the opposite end of said longitudinal passage in the plunger, said spray head having a discharge opening;

and a normally-closed check valve for blocking the flow of product from said longitudinal passage in the plunger to said discharge opening, said check valve opening in response to the pressure of product in said longitudinal passage in the plunger to pass product to said discharge opening;

said plunger being movable (a) in one direction in an intake stroke to create a partial vacuum in said cylinder means by the movement of said first skirt therealong and to move said first skirt past said product inlet opening to draw product from the dip tube into said cylinder means and to move said second skirt past said vent opening to a position blocking said vent opening from the atmosphere, and (b) in the opposite direction in a pressurizing stroke to block said cylinder means from said product inlet opening and pressurize the product in said cylinder means and force said product into said longitudinal passage in the plunger and to move said second skirt past said vent opening to a position connecting said vent opening to the atmosphere;

said cylinder means and said plunger providing an air passage extending from said second skirt toward spray head for connecting said vent opening to the atmosphere when said second skirt is past said vent opening in the direction along said cylinder means away from said spray head;

said cylinder means comprising outer and inner cylinders of the pump body which extend upright when the pump body is mounted on an upright container;

said plunger being movable up along said pump body in its intake stroke and down in its pressurizing stroke;

said one end of said longitudinal passage in the plunger being at the lower end of the plunger;

said inner cylinder having a closed lower end;

said product inlet opening in the inner cylinder being spaced substantially above its closed lower end;

said pump body presenting a space outside said inner cylinder extending up to said product inlet opening and a passageway for product from the dip tube into said space below said product inlet opening;

said plunger in its intake stroke causing said first skirt to slide up away from said closed lower end of the inner cylinder and up across said product inlet opening to draw product into said inner cylinder;

said plunger in its pressurizing stroke causing said first skirt to slide down across said product inlet opening and toward said closed lower end of the inner cylinder to force product from the inner cylinder up into said longitudinal passage in the plunger;

said body having a vent opening at the lower end of said outer cylinder and a longitudinal groove on the inside of said outer cylinder spaced above said vent opening;

said outer cylinder and said plunger providing an air leakage path between them above said longitudinal groove in the outer cylinder for venting said groove to the atmosphere;

said plunger in its intake stroke causing said second skirt to slide up past said groove in the outer cylinder to block said groove from the atmosphere;

and said plunger in its pressurizing stroke causing said second skirt to slide down along said groove in the outer cylinder to provide a vent passageway to the atmosphere.

6. A pump according to claim 5 wherein said spray head is on the upper end of said plunger and is manually engageable to move said plunger down in its pressurizing stroke, and further comprising a spring biasing said plunger up along said pump body.

7. A pump according to claim 6 and further comprising a pivoted flapper valve in said spray head at the upper end of said longitudinal passage in the plunger, said flapper valve being resiliently biased to a closed position blocking said longitudinal passage in the plunger from said discharge opening in the spray head.

8. A manually-operated pump for dispensing a flowable product from a container through a dip tube extending down into the container comprising:

a pump body having cylinder means with a product inlet opening for receiving product from said dip tube and a vent opening for connecting the interior of the container above the product therein to the atmosphere;

means for mounting said pump body on the top of the container;

a plunger reciprocable in said pump body along said cylinder means, said plunger carrying an annular first skirt slidable sealingly along the inside of said cylinder means past said product inlet opening to control the flow of product from the dip tube into said cylinder means, said plunger carrying an annular second skirt slidable sealingly along the inside of said cylinder means past said vent opening to control the venting of the interior of the container above the product therein to the atmosphere, said plunger having a longitudinal passage which at one end thereof opens into said cylinder means to receive product introduced into said cylinder means through said product inlet opening;

a spray head connected to receive product from the opposite end of said longitudinal passage in the plunger, said spray head having a discharge opening;

and a normally-closed check valve for blocking the flow of produce from said longitudinal passage in the plunger to said discharge opening, said check valve opening in response to the pressure of product in said longitudinal passage in the plunger to pass product to said discharge opening;

said plunger being movable (a) in one direction in an intake stroke to create a partial vacuum in said cylinder means by the movement of said first skirt therealong and to move said first skirt past said product inlet opening to draw product from the dip tube into said cylinder means and to move said second skirt past said vent opening to a position blocking said vent opening from the atmosphere, and (b) in the opposite direction in a pressurizing stroke to block said cylinder means from said product inlet opening and pressurize the product in said cylinder means and force said product into said longitudinal passage in the plunger and to move said second skirt past said vent opening to a position connecting said vent opening to the atmosphere;

said cylinder means and said plunger providing an air passage extending from said second skirt toward spray head for connecting said vent opening to the atmosphere when said second skirt is past said went opening in the direction along said cylinder means away from said spray head;

said plunger providing a valve seat at said opposite end of said longitudinal passage;

and said check valve comprises a valve member sealing engageable with said valve seat and spring means biasing said valve member against said valve seat;

said valve member having a nose on one end which is engageable with said valve seat and passage means extending from said nose to the opposite end of said valve member for passing the product when said valve member is unseated from said valve seat;
and said spring means being a bowed leaf spring;
and further comprising:
a stem attached to said leaf spring and extending from said leaf spring toward said discharge opening in the spray head, said stem having a longitudinal passage in one side for passing the product.

9. A pump according to claim 8 wherein said first and second skirts are on a ring mounted on said plunger for movement in unison with said plunger.

10. A pump according to claim 9 wherein said plunger has a longitudinal groove on the bottom providing said air passage for connecting said vent opening to the atmosphere.

* * * * *